(12) United States Patent
Beck (10) Patent No.: US 8,763,956 B2
(45) Date of Patent: Jul. 1, 2014

(54) REFUELING EQUIPMENT, AND METHOD FOR REFUELING AN AIRCRAFT USING SAID EQUIPMENT

(75) Inventor: Claude Beck, Bordeaux (FR)

(73) Assignee: Desautel, Lyons (FR)

( * ) Notice: Subject to any disclaimer, the term of this patent is extended or adjusted under 35 U.S.C. 154(b) by 279 days.

(21) Appl. No.: 13/318,180

(22) PCT Filed: May 4, 2010

(86) PCT No.: PCT/FR2010/050854
§ 371 (c)(1),
(2), (4) Date: Oct. 31, 2011

(87) PCT Pub. No.: WO2010/128246
PCT Pub. Date: Nov. 11, 2010

(65) Prior Publication Data
US 2012/0043425 A1  Feb. 23, 2012

(30) Foreign Application Priority Data

May 5, 2009  (FR) ...................................... 09 52974

(51) Int. Cl.
*B64D 37/14*  (2006.01)
(52) U.S. Cl.
USPC ........................... 244/135 A; 141/95; 340/611
(58) Field of Classification Search
USPC ........ 244/135 R, 135 A; 141/95, 83; 340/611
See application file for complete search history.

(56) References Cited

U.S. PATENT DOCUMENTS

| | | | |
|---|---|---|---|
| 5,881,779 A * | 3/1999 | Kountz et al. | 141/83 |
| 5,921,266 A | 7/1999 | Meyer | |
| 6,082,392 A * | 7/2000 | Watkins, Jr. | 137/312 |
| 6,234,224 B1 | 5/2001 | Schultz, Jr. | |
| 8,020,589 B2 * | 9/2011 | Cohen et al. | 141/95 |
| 8,485,474 B2 * | 7/2013 | Cutler et al. | 244/135 A |
| 8,511,351 B2 * | 8/2013 | Watkins et al. | 141/231 |
| 2005/0189036 A1 | 9/2005 | Bryan | |

(Continued)

FOREIGN PATENT DOCUMENTS

| | | | | |
|---|---|---|---|---|
| EP | 1865248 A1 * | 12/2007 | | F17C 5/00 |
| GB | 2293658 A | 4/1996 | | |
| WO | 97/23739 A | 7/1997 | | |

*Primary Examiner* — Benjamin P Lee
(74) *Attorney, Agent, or Firm* — Dowell & Dowell, PC (57) ABSTRACT

The invention relates to equipment for refueling an aircraft, including a pipe (40) provided with means (42) for connecting onto an intake port (301) of the fuel tank of the aircraft (400) and, at or in the vicinity of the connection means (42), means (501) for determining the value of at least one parameter representative of a flow (E) of fuel passing through the connection means. Said equipment further includes at least one receiver onboard the refueling equipment (1), means (503, 504) for transmitting, to the receiver, a signal (Si(P)) representative of a parameter value predetermined by determination means (501) and an electronic unit capable of receiving, from the receiver, a signal representative of the parameter and of driving at least one flow control and monitoring device in accordance with the signal received from the receiver. The refueling method includes the steps of during a refueling operation, determining the value of at least one parameter representative of the flow (E) at or in the vicinity of the connection means (42), transmitting, to at least one receiver onboard the refueling apparatus, a signal (Si(P)) representative of a parameter value predetermined during the previous step, and automatically driving, in accordance with the signal received by the receiver, a flow control and monitoring device.

16 Claims, 4 Drawing Sheets

(56) References Cited

U.S. PATENT DOCUMENTS

| | | | |
|---|---|---|---|
| 2006/0237591 A1* | 10/2006 | McCoskey et al. | 244/135 R |
| 2008/0000542 A1* | 1/2008 | Cohen et al. | 141/18 |
| 2010/0213318 A1* | 8/2010 | Hudson | 244/135 A |
| 2011/0030839 A1* | 2/2011 | Lohmann et al. | 141/4 |
| 2012/0227864 A1* | 9/2012 | Mori | 141/95 |
| 2013/0037165 A1* | 2/2013 | Okawachi et al. | 141/4 |
| 2013/0119202 A1* | 5/2013 | French | 244/135 A |
| 2013/0126676 A1* | 5/2013 | Travers et al. | 244/135 A |

\* cited by examiner

REFUELING EQUIPMENT, AND METHOD FOR REFUELING AN AIRCRAFT USING SAID EQUIPMENT

BACKGROUND OF THE INVENTION

1. Field of the Invention

The invention relates to a refueling equipment for refueling an aircraft as well as a method for refueling an aircraft using such equipment.

2. Brief Description of the Related Art

At civil and military airports and aerodromes, it is known to use refueling equipments that are moved near the aircrafts to fill their tanks with fuel. A first type of refueling equipment comprises "refueling tankers" which are vehicles provided with a tank from which fuel is drawn to be transferred to a fuel tank of an aircraft. A second type of refueling equipment comprises vehicles intended to connect to an outlet mouth of a fixed fuel distribution grid, sometimes called "hydrant system." These vehicles of the second type are commonly called "servicers" and are provided to be connected, on the one hand, onto the hydrant system, and on the other hand, onto the fuel tank of the aircraft, while allowing the hydrant system and that fuel tank to be connected.

With these two types of refueling equipment, a flexible hose is used to connect a fuel circulation system from the tank or hydrant system, to the inlet of a fuel tank of the aircraft. To that end, the downstream end of the flexible hose is provided with means for connecting on the intake port of the aircraft fuel tank. A refueling equipment is generally equipped with means for monitoring, metering and controlling the flow of fuel, such as flow meter(s), volume counter(s) and a pressure regulator, these devices being mounted on the equipment and making it possible to drive the flow in an open loop. When it leaves the pipe formed on the chassis of the equipment through rigid hoses, the flow penetrates the flexible hose under enslaved, but not continuously monitored, pressure, which poses a reliability problem. Given the position of the flexible hose, the pressure losses it causes are variable, to the point that the pressure of the fuel penetrating the fuel tank of the aircraft is not precisely controlled, whereas it must be limited to 3.5 bar so as not to damage the structure of the aircraft, while also being as high as possible so as not to needlessly extend the refueling time for an aircraft. Furthermore, the control and monitoring devices mounted on the refueling equipment must be subject to periodic verification, because they alone set the pressure of the fuel entering the aircraft's fuel tank. This periodic verification time decreases the actual operating time, and therefore the availability, of each refueling equipment.

It is known from U.S. Pat. No. B-6,234,224 to mount a pressure gauge at the downstream end of a fuel supply hose of an aircraft. This gauge is not very accessible and the detection of an overpressure depends on the operator's concentration. Furthermore, even if he detects an overpressure, the operator, who then stays near the fuel tank of the aircraft, cannot act on the flow to decrease its pressure.

SUMMARY OF THE INVENTION

The invention more particularly aims to resolve these drawbacks by proposing new refueling equipment having a more reliable operation.

To that end, the invention relates to equipment for refueling an aircraft, said equipment comprising a pipe provided with means for connecting onto an intake port of a fuel tank of an aircraft. Said equipment comprises, at or in the vicinity of the connection means to the aircraft, means for determining the value of at least one parameter representative of a flow of fuel passing through the connection means. The equipment is characterized in that it comprises at least one receiver onboard the refueling equipment, means for transmitting, to the receiver, a signal representative of a parameter value predetermined by the aforementioned determination means and an electronic unit capable of receiving, from the receiver, a signal representative of the aforementioned parameter and of driving at least one flow control and/or monitoring device in accordance with the signal received from the receiver.

Within the meaning of the present invention, the determination means are in the vicinity of or at the connection means in that they are close to the transfer point of the fuel between the refueling system and the fuel tank of the aircraft. This transfer point is defined by the downstream end of the connection means, which in turn are mounted at the downstream end of the flexible hose of the refueling equipment. In practice, the means for determining the value of the parameter are arranged less than 50 cm from said transfer point.

Owing to the invention, it is possible to know the value of the flow parameter, for example its pressure, immediately before the fuel penetrates the fuel tank. The transmission means and the receiver make it possible for the value of that parameter to be taken into account by the control system onboard the equipment, in particular through the electronic unit, so as to keep that value in a predetermined range corresponding to the recommendations by the aircraft builder and the aeronautic and oil authorities.

According to other advantageous, but non-obligatory aspects of the invention, such equipment can incorporate one or more of the following features, in any technically allowable combination:

- The determination means comprise a flow pressure sensor, a flow volume sensor, potentially of metrological precision, and/or a flow temperature sensor. These means may be completed by measurements of the turbidity of the distributed fuel, its density, etc.
- The equipment also comprises, at or near the connection means, means for identifying an aircraft and means for transmitting, toward a receiver onboard the refueling equipment, a signal representative of the result of the identification obtained by the identification means.
- The transmission means are wireless transmission means.
- The transmission means can transmit the representative signal, for comparison purposes for validation, on at least two distinct channels, preferably three distinct channels, or toward at least two distinct addresses, preferably three distinct addresses.
- The equipment comprises means for recording determined values of the parameter(s) and, possibly, identification data for the aircraft.
- The equipment comprises, at or near the connection means, independent supply means for the determination means, the transmission means, and, if applicable, the identification means.
- The refueling equipment is a servicer equipped with a hose making it possible to connect it onto an output mouth of a fixed fuel distribution grid and the electronic unit drives devices that control and monitor the flow between the mouth and the inlet of the aircraft's fuel tank, based on the signal received from the receiver.
- Alternatively, the refueling equipment is equipped with a tank and the electronic unit drives devices that control and monitor the flow between the tank and the inlet of the fuel tank of the aircraft, based on the signal received from the receiver.

The invention also relates to a method for refueling an aircraft that can be implemented using equipment as mentioned above and, more specifically, a method in which one connects, using connection means, a pipe supported by refueling equipment to the intake of a fuel tank of an aircraft and causes a flow of fuel to circulate in the pipe as far as the fuel tank. This method comprises the steps of, during a refueling operation:

a) determining the value of at least one parameter representative of the flow at or in the vicinity of the connection means, b) transmitting, to at least one receiver onboard the refueling apparatus, a signal representative of a parameter value predetermined during step a); and c) automatically driving, in accordance with the signal received by the receiver, at least one flow control and monitoring device.

Advantageously, the method comprises the additional steps of:

d) upon receipt of a signal by the receiver, comparing the value of the parameter to a reference value, and e) based on the result of the comparison in step c), continuing, in normal or degraded mode, or interrupting the refueling operation in progress.

BRIEF DESCRIPTION OF THE DRAWINGS

Furthermore, it is possible to provide that steps a) and b) are carried out continuously or repeatedly during a refueling operation and that the values of the parameters determined during step a) are recorded over the duration of the refueling operation.

The invention will be better understood and other advantages thereof will appear more clearly in light of the following description of one embodiment of a refueling equipment and a refueling method according to its principle, provided solely as an example and done in reference to the appended drawings, in which.

DESCRIPTION OF THE PREFERRED EMBODIMENT

Figure 1:
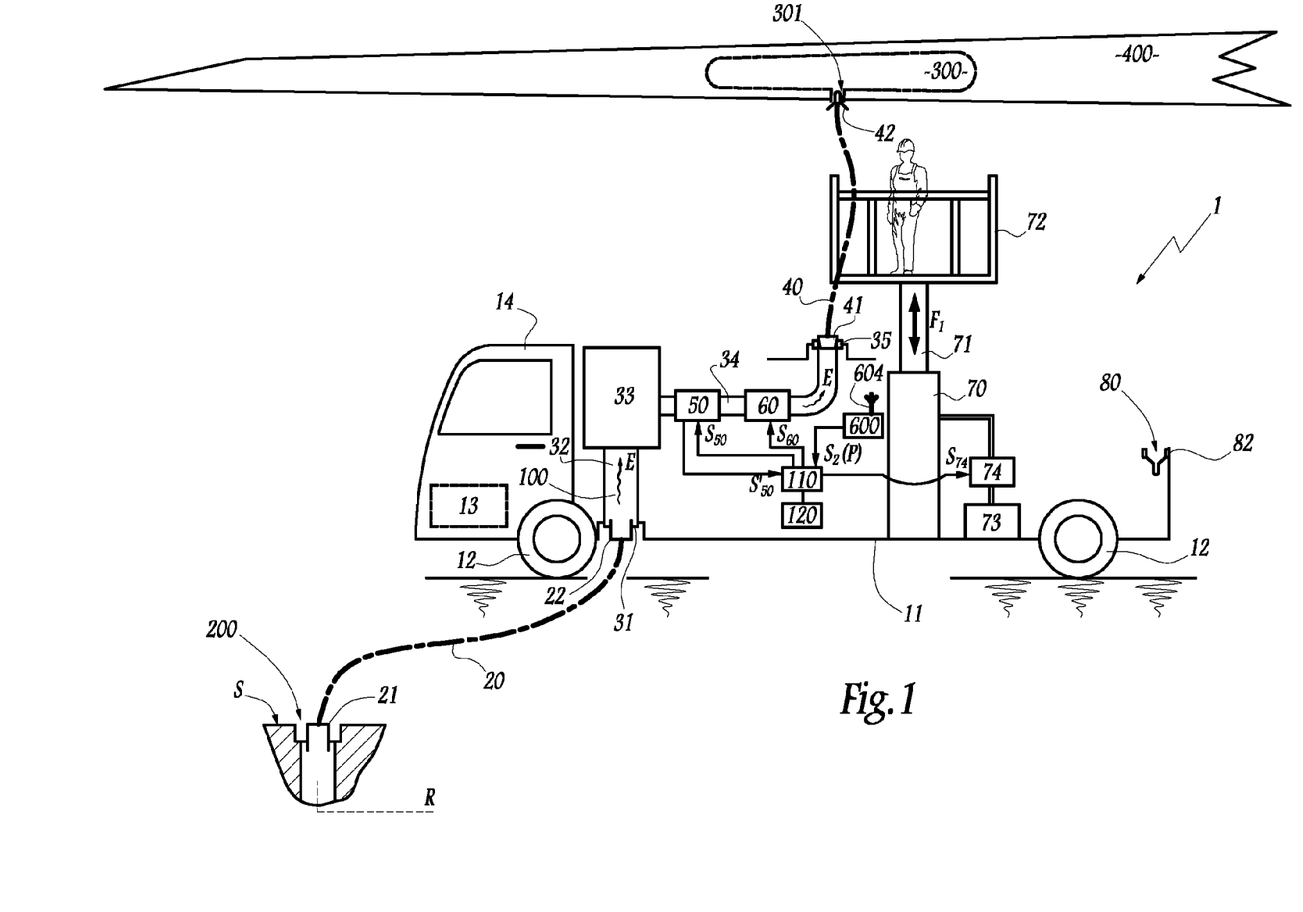
FIG. 1 is a schematic diagram illustrating refueling equipment according to the invention during use to fill the fuel tank of an aircraft with fuel.

The refueling equipment or servicer 1 shown in FIG. 1 generally assumes the form of an industrial vehicle and includes a chassis 11 that rests on the ground via wheels, two of which are visible with reference 12, and which supports an internal combustion engine 13 above which a cab 14 is positioned for the equipment's driver.

The equipment 1 is equipped with a flexible hose 20 making it possible to connect it onto an outlet mouth 200 belonging to a fixed fuel distribution grid R in an airport. The mouth 200 is positioned under the surface S of the ground, in the vicinity of a parking space for an aircraft. The hose 20 is equipped with a connector 21 for connecting onto the mouth 200. At its end opposite the connector 21, the hose 20 is equipped with another connector 22 for connecting onto a connector 31 making up the nozzle of a fixed pipe 32 of the equipment 1. In other words, the hose 20 makes it possible to connect the outlet mouth 200 that belongs to the fixed grid R to the pipe 32, which belongs to the equipment 1.

The pipe 32 emerges into a filter 33 provided to rid the fuel of any residue, in particular aqueous, that it may contain.

Downstream of the filter 33, a pipe 34 extends as far as a connector 35 on which an upstream connector 41 of a second flexible hose 40 is connected whereof the downstream end is equipped with a "wing fastener" 42, which constitutes a means for connecting the hose 40 on an intake port 301 of a fuel tank 300 incorporated into the wing 400 of an airplane.

For the clarity of the drawings, the flexible hoses 20 and 40 are shown, in FIG. 1, by lines with axes corresponding to their respective longitudinal axes.

Figure 2:
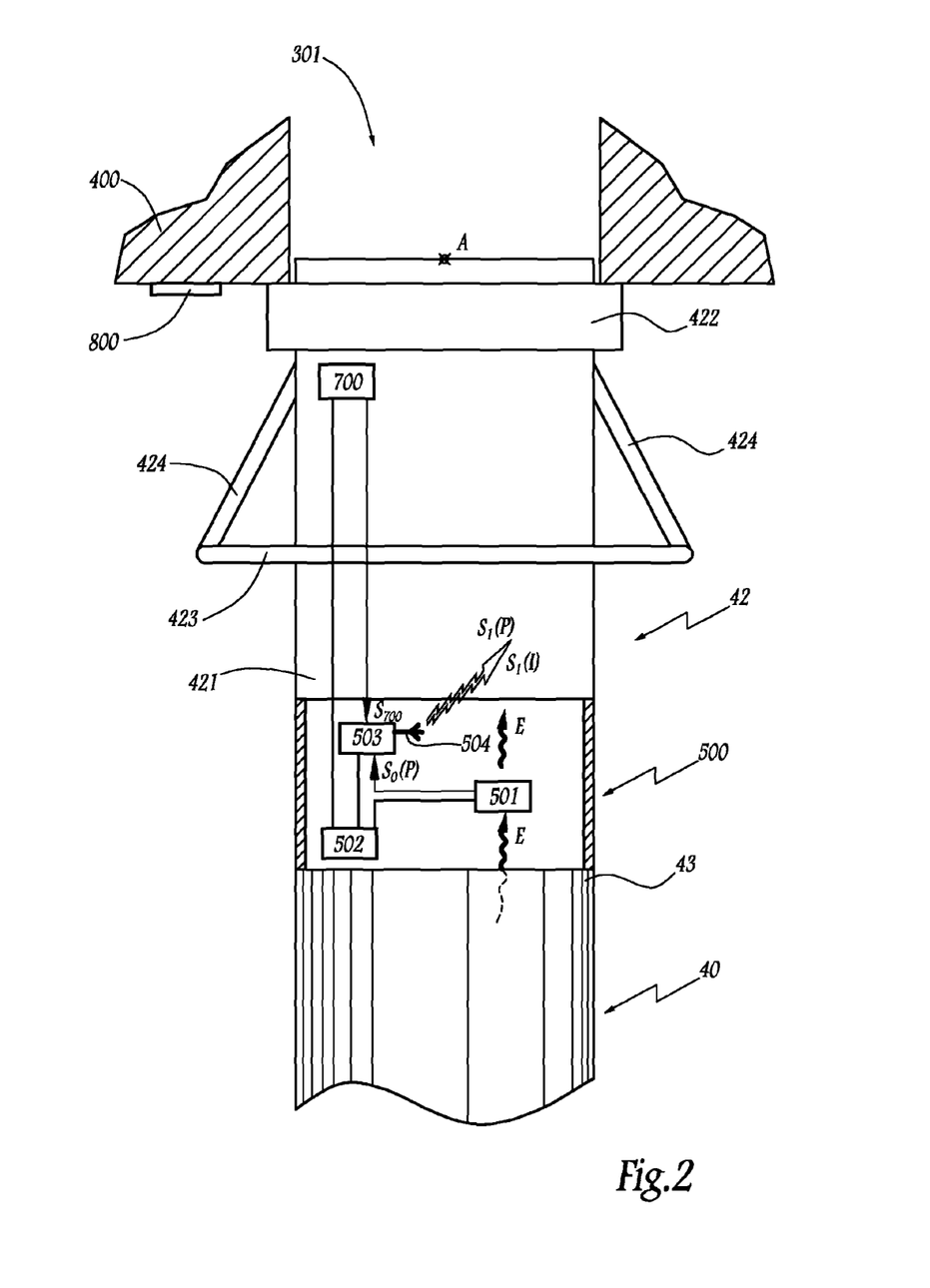
FIG. 2 is a larger-scale schematic diagram illustrating the downstream end of a flexible hose for connecting the equipment to the fuel tank, placed on the intake port of a fuel tank.

The wing fastener 42 comprises a cylindrical body 421 equipped with a ring 422 allowing it to be locked through shape cooperation on a corresponding connector (not shown) delimiting the port 301. The wing fastener 42 is also provided with a handwheel 423 in the shape of a circular tube surrounding the body 421 and connected thereto by two rigid arms 424. Alternatively, said handwheel may be replaced by handles.

The elements 32 to 34 together define a fixed flow path for the fuel in the equipment 1, between two flexible lines respectively formed by the hoses 20 and 40. This fixed flow path and these flexible lines extend between the first connection means 21 on the grid R and the second connection means 42 on the port 301.

E denotes the flow of fuel between the mouth 200 and the fuel tank 300.

The equipment 1 is equipped with a counter 50 that makes it possible to measure the quantity of fuel passing through the pipe 34, i.e. the quantity of fuel delivered to the fuel tank 300. The equipment also includes a pressure regulator 60 that makes it possible to monitor the pressure of the flow E in the pipe 34.

The equipment 1 supports a hydraulic cylinder 70 whereof the shaft 71 is equipped with a platform 72 on which an operator stands who can manipulate the downstream part of the hose 40, in particular the wing fastener 42. The shaft 71 allows the operator, through an ascending or descending vertical movement represented by the double arrow $F_1$, to access the intake port 301.

An electric-motor hydraulic pump 73 is used to provide the cylinder 70 with a sufficiently pressurized quantity of oil to maneuver the shaft 71, upward or downward. A solenoid valve set 74 makes it possible to monitor the flow of pressurized oil from the pump 73 toward the cylinder 70.

An electronic unit 110 is mounted on the chassis of the equipment 1 and monitors, via adapted electronic signals $S_{50}$, $S_{60}$ and $S_{74}$, the counter 50, pressure regulator 60 and solenoid valve set 74, respectively.

Elements 73 and 110 are supplied with electrical current by means that are not shown.

A module 500 is positioned between the downstream end 43 of the hose 40 and the wing fastener 42. Said module is shown in cross-section in FIG. 2, while the wing fastener 42 and the hose 40 are shown in side view.

The module 500 assumes the form of a connecting ring between the end 43 and the wing fastener 42. It comprises a cell 501 for measuring the pressure of the flow E penetrating the wing fastener 42.

Given the location of the module 500, which is in the immediate vicinity of the wing fastener 42, the cell 501 makes it possible to know, with a satisfactory degree of precision, the pressure of the flow E when it penetrates into the fuel tank 300, through the port 301. In other words, the location of the module 500, at the connection means formed by the wing fastener 42, allows the cell 501 to give a value representative of the pressure P of the flow E passing through the wing fastener 42.

In the example, the module 500 is in contact with the wing fastener 42, so that the distance between the cell 501 and the transfer point A for transferring fuel from the refueling system toward the aircraft is less than 50 cm.

The transfer point of the fuel A is defined at the outlet of the wing fastener 42 as the point where the ownership of the fuel goes from the company supplying the fuel to the company operating the aircraft.

The cell 501 is supplied with electrical energy from a battery 502, incorporated into the module 500 and recharged when the wing fastener 42 is stored in a receptacle 80 provided to that end on the equipment 1. The receptacle 80 is equipped with a charger 82 positioned so that the battery 502 comes opposite said charger when the wing fastener 42 is arranged in the receptacle 80, which makes it possible to charge the battery 502 by induction.

Alternatively, the battery 502 can be replaced by a capacitor, in which case the charger 82 is adapted accordingly.

The cell 501 is electrically connected to a radio transmitter 503, which in turn is powered by the battery 502. The cell 501 supplies the transmitter 503 with an electronic signal $S_0(P)$ corresponding to the value of the pressure it detects.

The transmitter 503 is equipped with an antenna 504 that allows it to transmit a non-wired signal $S_1(P)$ including data corresponding to the value of the pressure P detected by the cell 501.

As an example, the transmission mode of the signal $S_1(P)$ can be by radio, infrared, etc.

Furthermore, the equipment 1 is equipped with a receiver 600 matched to the module 500. Its antenna or sensor 604 allows it to receive the signal $S_1(P)$.

The receiver 600 can then transmit, to the electronic monitoring unit 110, a signal $S_2(P)$ representative of the pressure of the flow E detected by the cell 501.

The unit 110 can then take the value of that pressure P into account to drive, in particular, the pressure regulator 60 using the appropriate electronic signal $S_{60}$. The counter 50 in turn provides the unit 110 with a signal $S'_{50}$ representative of the counting it does.

Figure 3:
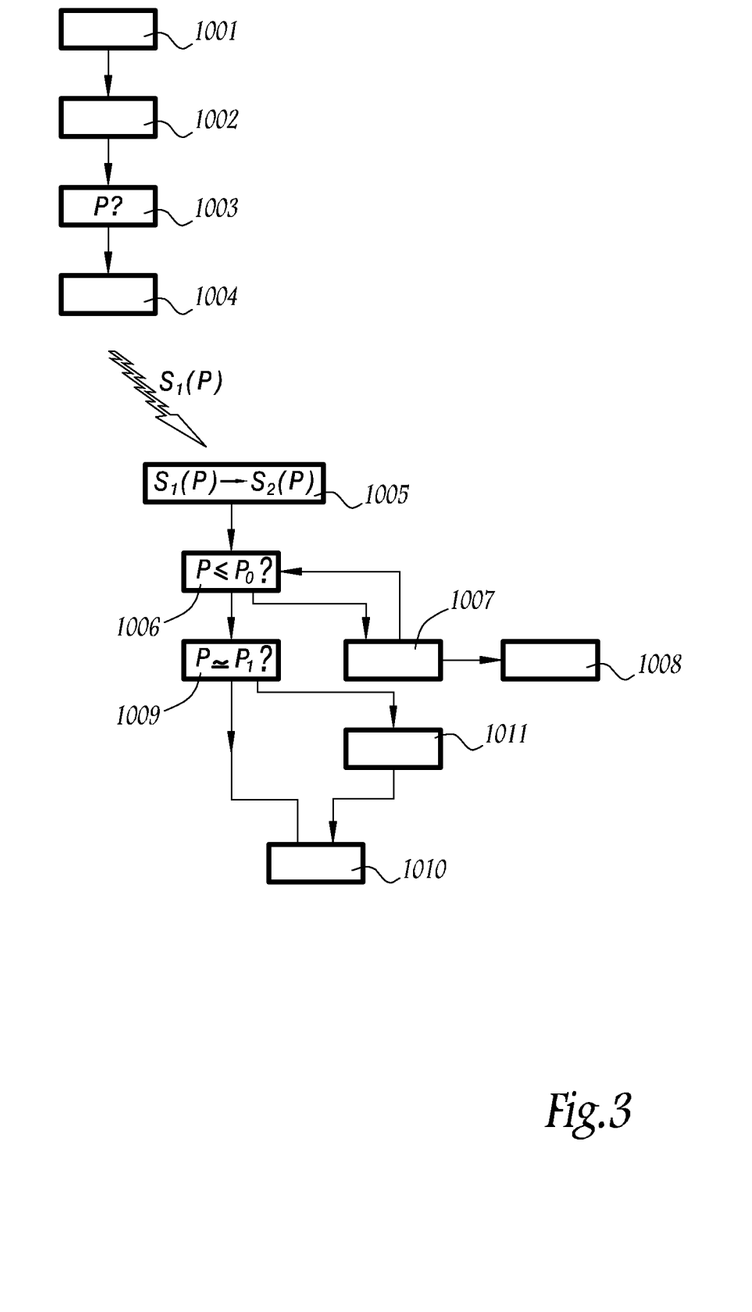
FIG. 3 is a partial block diagram of a refueling method implemented using the equipment of FIGS. 1 and 2.

As shown in FIG. 3, when a refueling operation is initiated in an initial step 1001, the electronic control unit 110 controls electronic devices for controlling and monitoring the flow E between the mouth 200 and the fuel tank 300, in particular the pressure regulator 60. This occurs in a second step 1002 of the method.

In a third step 1003, the cell 501 determines the flow pressure E in the module 500, i.e. in the vicinity of the transfer point A.

This pressure being determined, it is incorporated into the non-wired signal $S_1(P)$ that is emitted by the transmitter 503 during a subsequent step 1004.

Steps 1003 and 1004 are repeated at regular intervals throughout the entire duration of the refueling operation, for example every 10 ms.

During a subsequent step 1005, the signal $S_1(P)$ emitted by the transmitter 503 is received by the receiver 600 and transmitted to the unit 110 in the form of signal $S_2(P)$.

During a subsequent step 1006, the unit 110 extracts the value of the pressure P from the signal $S_2(P)$ and compares that value to a threshold value $P_0$ equal, for example, to 3.5 bar. If the signal $S_1(P)$ is encoded, it is decoded during this step. During this step, the value P of the pressure is stored in a memory 120 associated with the unit 110.

If the pressure P is greater than said reference value, an automatic cycle is activated in step 1007. First, this cycle corrects the value to try to return the deviation to an acceptable level. Said deviation is measured again in step 1006. If the deviation does not decrease, then the system forces a secured mode that tends toward limitation of the pressure, i.e. operation in degraded mode. And if this pressure does not decrease toward the imposed instruction, then the refueling operation is stopped in step 1008. An alarm is then activated so that the operator can take appropriate withdrawal measures.

If the value of the pressure P is below the reference value $P_0$, then that pressure value P is compared to a reference value $P_1$ in step 1009. If the value P can be considered substantially equal to value $P_1$, for example with a configurable deviation smaller than 5%, the refueling operation continues without modifying the setting parameters of the pressure regulator 60, in step 1010. If the pressure P deviates from the value $P_1$ by more than 5%, the setting of the regulator 60 is adjusted in step 1011 before the refueling operation is continued in step 1010.

Steps 1005 to 1011 are implemented after each receipt of a signal $S_1(P)$. In particular, the pressure values P successively received from the cell 501 are stored in the memory 120 throughout the entire refueling operation.

To reliabilize the transmission of the signal $S_1(P)$ between the transmitter 503 and the receiver 600, this transmission occurs simultaneously, on three different channels or with different addresses. In that case, the data transmitted on the different channels or recovered by the different addresses is compared and validated if its values remain within the deviations deemed acceptable, for example 1%. In case of failure of a transmission chain, on a channel or by a specific address, the failing chain is automatically isolated and a pre-alert is sent to the operator. In the unlikely event that two signal transmission chains fail at the same time, operation in degraded mode is established, in which the pressure regulator 60 is driven to regulate the pressure at the outlet of the pipe 34 at a value strictly below the value $P_0$ so that, given the pressure losses that must occur in the hose 40, the pressure at the transfer point A is necessarily below that value.

In non-degraded operating mode, the invention makes it possible to drive the pressure regulator 60 with a reference value higher than the value $P_0$, so that the flow pressure E at the transfer point and within the wing fastener 42 is as close as possible to the value $P_1$, which can be equal to the value $P_0$, 3.5 bar in the example, or lower.

In addition to or in place of the cell 501, the module 500 can be equipped with a cell for detecting the temperature of the flow E, a cell for measuring, possibly metrologically, the volume of said flow, and/or a cell for measuring the turbidity or density of the distributed fuel, the value of these parameters being transmitted to the unit 110 as previously explained for the signal representative of the pressure. The transmission means can be shared by the various measuring cells when several cells are incorporated into the module 500.

Furthermore, according to one advantageous but optional aspect of the invention, an identification sensor 700 is mounted on the body 421 of the wing fastener, near the ring 422. This sensor, supplied with electrical current by the battery 502 only, is connected to the transmitter 503. This sensor is adapted to read a label 800 fixed on the wing 400 of the airplane, near the port 301 and containing identifiers I of the airplane, for example its registration, the type of fuel required and/or administrative data relative to payment for the refueling transaction. For example, the label 800 can be of the RFID type and the sensor 700 is adapted to recover data from that label.

The data collected using the sensor 700 is sent to the transmitter 503 in the form of an electronic signal $S_{700}$ and the transmitter 503 transmits it in the form of a non-wired signal $S_1(I)$ to the unit 110, via the receiver 600. This identification of the aircraft takes place automatically at the beginning of the refueling operation. This avoids the serious risks of incompatibility on the type of fuel supplied to the aircraft requiring refueling.

Figure 4:
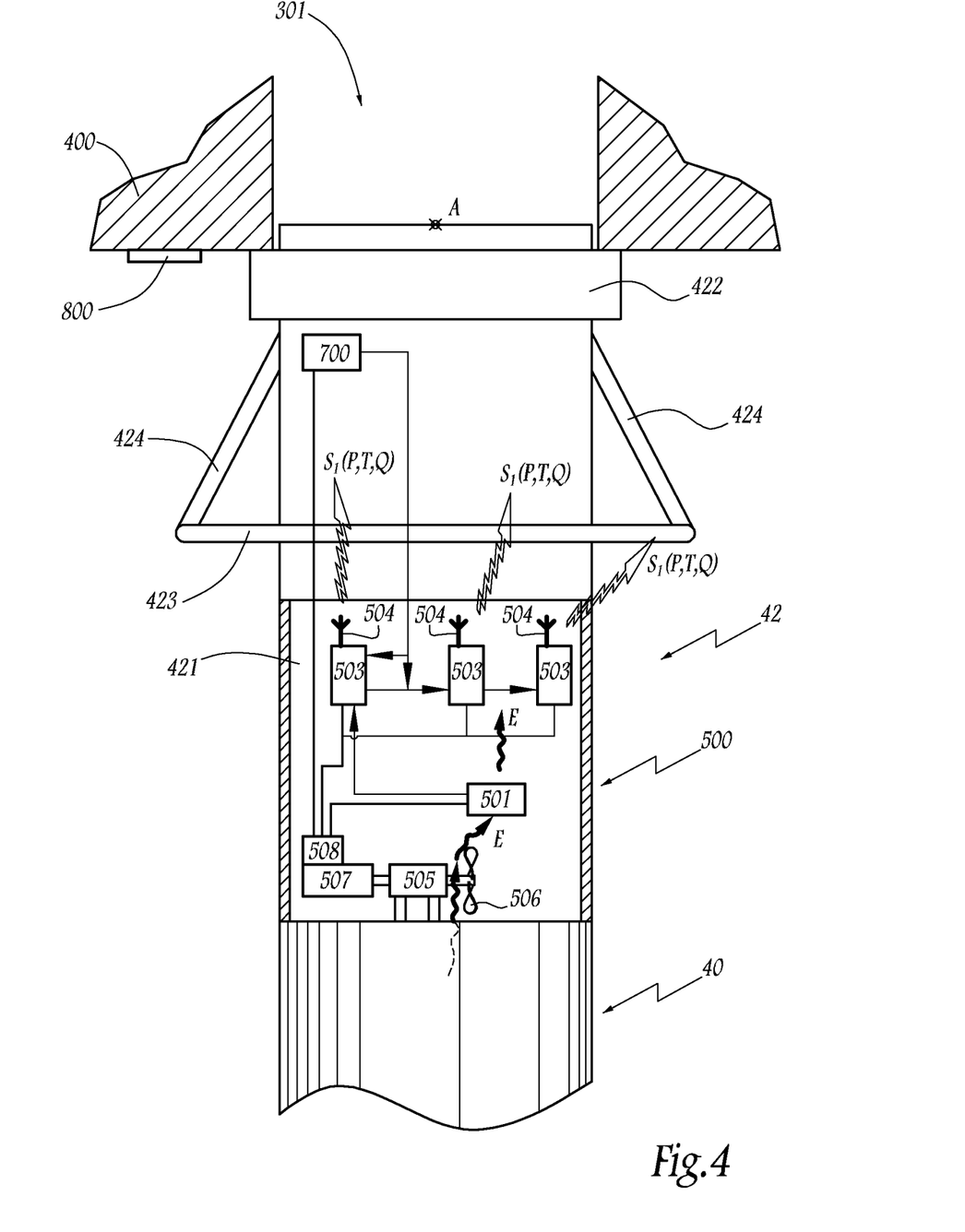
FIG. 4 is a view similar to FIG. 2, for equipment according to a second embodiment of the invention.

In the second embodiment of the invention shown in FIG. 4, the elements similar to those of the first embodiment bear the same references. The wing fastener 42 of this embodiment is associated with a module 500 that comprises a cell 501 for measuring the pressure, temperature and volume, possibly metrological, of the flow E. In other words, the cell 501 of this embodiment is a triple cell making it possible to determine three physical parameters of the flow E. This does not exclude the determination of new parameters, such as the turbidity of the fuel, its density, and more generally all of the useful physical characteristics, specific to the delivered fuel and specific to the progression of the refueling operation.

In place of the battery 502 of the first embodiment, the propeller 506 of a turbine 505 is installed on the flow E path. This turbine 505 is coupled to an alternator 507 and a rectifier 508 making it possible to supply direct current to the cell 501, three transmitters 503 and a sensor 700 similar to those of the first embodiment.

In practice, the rotor of the alternator 507 can be made up of magnets mounted on the shaft of the propeller 506 and positioned opposite a fixed coil. It is also possible to provide for the induction charging of a battery or capacitor when the module 500 is stored in a receptacle similar to that of the first embodiment. This makes it possible to have electrical energy for the elements 501 and 502 even before the flow E is established.

Thus, in the two considered embodiments, autonomous means formed by the battery 502 of the first embodiment or by the assembly 505-508 of the second embodiment make it possible to power the measuring cell 501, the transmitter(s) 503 and the sensor 700. It is therefore not necessary to supply the module 500 and its accessories with current from the servicer 1.

The propeller 506 can constitute the primary or secondary counting means, possibly metrological, of the distributed fuel volume.

In this embodiment, three transmitters 503 are used while being distributed around the body 421 of the wing fastener 42, so that their antennas or transmission means 504 can transmit in several directions, which guarantees good transmission of the signal such as the signal $S_1(P)$ mentioned for the first embodiment, to the receiver 600. These transmitters 503 can be configured to transmit to three distinct receiver addresses, several receivers 600 being able to be provided on the equipment 1, with the aim of securing and reliabilizing the non-wired exchanges of data.

In this second embodiment, the signal transmitted by the transmitters 503 is representative of the values of the pressure P, temperature T and volume V of the flow E from the beginning of the refueling operation. This signal $S_1(P, T, V)$ is processed by the receiver(s) 600 and by the unit 110 in a manner comparable to that explained for the first embodiment. In particular, a signal $S_2(P, T, V)$ representative of the pressure, temperature and volume values is transmitted by the receiver(s) 600 to the electronic unit 110. The comparison with threshold values is done by the unit 110 for each of the concerned physical parameters or for only some of them. The values of these parameters are stored in the memory 120, as in the first embodiment.

In both embodiments, storing values representative of certain parameters of the flow E in the memory 120 enables an a posteriori analysis of the proper operation of the equipment 1 during a refueling operation. It is in particular possible for the company distributing the fuel to provide the aircraft's operator or the authorities with a statement showing all of the values of the parameter(s), for example the pressure, noted near the transfer point A during a refueling operation. This makes it possible to ensure that no threshold values have been exceeded and limits the periodic audit of flow E monitoring apparatuses such as the regulator 60. The memory 120 can also be used to store the identification data I collected by the sensor 700, which covers the traceability needs of the refueling operations while also making the task of imputing refueling costs easier.

The invention is described above in the case where it is implemented using a module 500 inserted between the downstream end 43 of the hose 40 and the wing fastener 42, which makes it possible to use a standard wing fastener, by potentially affixing an identification sensor 700 on the outside of its body. Alternatively, the means for determining the value of the flow parameter, the transmission means and, possibly, the identification means, such as the aforementioned elements 501, 503 and 700, are incorporated into a wing fastener designed to that end.

The invention is described above in the case of implementation with a servicer connected on a hydrant system. It can, however, be implemented with a refueling tanker equipped with a tank for transporting fuel to the vicinity of the aircraft to be refueled.

Although the invention has been described above during the use thereof to fill an airplane fuel tank, it can be used to fill a fuel tank of any type of aircraft, in particular a helicopter.

The invention claimed is:

1. Refueling equipment for refueling an aircraft, the refueling equipment comprising a pipe provided with connecting means for connecting onto an intake port of a fuel tank of an aircraft and, at or in the vicinity of the connection means to the aircraft, determination means for determining the value of at least one parameter representative of a flow of fuel passing through the connection means, the equipment also including:
    at least one receiver onboard the refueling equipment,
    transmitting means for transmitting, to the receiver, a signal representative of the at least one parameter value predetermined by the determination means, and
    an electronic unit for receiving, from the receiver, a signal representative of the at least one parameter and for driving at least one flow control and monitoring device in accordance with the signal received from the receiver,
    and wherein the determination means determines a value of a pressure of the flow of fuel, and the transmitting means sends to the receiver a signal representative of the value of the pressure determined by the determination means and,
    wherein the electronic unit compares the value of the pressure to a reference value and to correct or limit the value of the pressure of the flow of fuel if the value of the pressure is greater than the reference value.

2. The equipment according to claim 1, wherein the determination means includes at least one of a flow pressure sensor, a flow volume sensor, and a flow temperature sensor.

3. The equipment according to claim 2, including, at or near the connection means, autonomous power supply means for the determination means, the transmission means and the identification means.

4. The equipment according to claim 1, also including, at or near the connection means, identification means for identifying an aircraft and another transmitting means for transmitting, toward a receiver onboard the refueling equipment, a signal representative of the result of the identification obtained by the identification means.

5. The equipment according to claim 1, wherein the transmitting means includes a wireless transmission means.

6. The equipment according to claim 1, wherein the transmitting means transmits the representative signal on at least two distinct channels.

7. The equipment according to claim 6, wherein the transmitting means transmits the representative signal toward at least two distinct addresses.

8. The equipment according to claim 1, including recording means for recording determined values of the pressure of the flow of fuel for the aircraft.

9. The equipment according to claim 8, wherein the recording means for recording the determined values of the pressure of the flow of fuel includes means for recording identification data for the aircraft.

10. The equipment according to claim 1, including, at or near the connection means, autonomous power supply means for the determination means and the transmitting means.

11. The equipment according to claim 1, which is a servicer equipped with a hose to connect onto an output mouth of a fixed fuel distribution grid and in that the electronic unit which drives the flow control and monitoring devices control and monitor the fuel flow between the output mouth and the inlet port of the aircraft's fuel tank, based on the signal received from the receiver.

12. The equipment according to claim 1, in combination with a fueling tanker equipped with a tank and in that the electronic unit drives the at least one flow control and monitor device to control the flow between the tank and the intake port of the fuel tank of the aircraft, based on the signal received from the receiver.

13. The equipment according to claim 1, wherein the transmitting means transmits the representative signal on at least three distinct channels.

14. The equipment according to claim 13, wherein the transmitting means transmits the representative signal toward at least three distinct addresses.

15. A method for refueling an aircraft that can be implemented using equipment in which one connects, using connection means, a pipe supported by refueling equipment to an intake of a fuel tank of an aircraft and causes a flow of fuel to circulate in the pipe as far as the fuel tank, the method comprising the steps of, during a refueling operation:

a) determining the value of at least one parameter representative of the flow of fuel at or in the vicinity of the connection means, including the pressure of the flow of fuel, b) transmitting, to at least one receiver onboard a refueling apparatus, a signal representative of a the pressure value predetermined during step a), c) receiving via the receiver, the signal representative of the pressure, d) comparing the value of the pressure to a reference pressure value and e) automatically driving, in accordance with the signal received by the receiver, at least one flow control and/or monitoring device, through implementation, when the pressure is greater than the reference pressure value, of the following steps:

correcting the value of the fuel flow pressure, in order to decrease the difference between fuel flow pressure and the reference pressure value, switching into a secured mode, with limitation of the pressure, or stopping of the refueling operation.

16. The method according to claim 15, wherein steps a) and b) are carried out continuously or repeatedly during a refueling operation and that the values of the parameters determined during step a) are recorded over a duration of the refueling operation.

* * * * *